(12) United States Patent
Shiba

(10) Patent No.: US 11,188,153 B2
(45) Date of Patent: Nov. 30, 2021

(54) ELECTRONIC APPARATUS, CONTROL METHOD THEREFORE, AND STORAGE MEDIUM

(71) Applicant: CANON KABUSHIKI KAISHA, Tokyo (JP)

(72) Inventor: Hidenori Shiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/829,394

(22) Filed: Mar. 25, 2020

(65) Prior Publication Data
US 2020/0310547 A1 Oct. 1, 2020

(30) Foreign Application Priority Data
Mar. 26, 2019 (JP) .............................. JP2019-058151

(51) Int. Cl.
*G06F 3/048* (2013.01)
*G06F 3/01* (2006.01)
*G06F 3/16* (2006.01)

(52) U.S. Cl.
CPC ................ *G06F 3/016* (2013.01); *G06F 3/16* (2013.01)

(58) Field of Classification Search
None
See application file for complete search history.

(56) References Cited

U.S. PATENT DOCUMENTS

| 9,785,236 B2* | 10/2017 | Afshar | G06F 1/1626 |
|---|---|---|---|
| 2006/0238499 A1* | 10/2006 | Wenstrand | G06F 3/0346 345/156 |
| 2008/0257018 A1* | 10/2008 | Inada | F02P 17/12 73/35.08 |
| 2010/0070073 A1* | 3/2010 | Foley | G01G 13/003 700/240 |
| 2010/0173686 A1* | 7/2010 | Grant | A63F 13/42 463/2 |
| 2010/0286522 A1* | 11/2010 | Beach | A61B 8/08 600/441 |
| 2011/0066411 A1* | 3/2011 | Morio | G01H 17/00 703/2 |
| 2013/0281165 A1* | 10/2013 | Ito | H04M 19/047 455/567 |

(Continued)

FOREIGN PATENT DOCUMENTS

JP 2017-049698 A 3/2017

*Primary Examiner* — Hua Lu
(74) *Attorney, Agent, or Firm* — Cowan, Liebowitz & Latman, P.C.

(57) ABSTRACT

In order to provide an electronic apparatus that can adaptively vibrate a user interface member so that a user can recognize an operation of the user interface member even while recording a sound, the electronic apparatus comprises a user interface member that can be operated by a user, a vibrator for vibrating the user interface member at a predetermined frequency, an environmental sound detector for detecting an environmental sound at the predetermined frequency, and a controller for suppressing the vibration of the vibrator at the predetermined frequency according to a level of the environmental sound at the predetermined frequency detected by the environmental sound detector.

14 Claims, 11 Drawing Sheets

(56) References Cited

U.S. PATENT DOCUMENTS

| | | | | |
|---|---|---|---|---|
| 2013/0346764 | A1* | 12/2013 | Gullbrand | H02M 1/44 |
| | | | | 713/300 |
| 2015/0179181 | A1* | 6/2015 | Morris | H04S 7/305 |
| | | | | 704/226 |
| 2015/0332564 | A1* | 11/2015 | Weinberg | G08B 3/10 |
| | | | | 340/407.1 |
| 2016/0129182 | A1* | 5/2016 | Schuster | G16H 40/63 |
| | | | | 702/56 |
| 2017/0060245 | A1* | 3/2017 | Kukimoto | G06F 3/04842 |
| 2017/0208195 | A1* | 7/2017 | Yamamoto | H04N 1/04 |
| 2017/0356936 | A1* | 12/2017 | Ismail | G01M 13/045 |
| 2018/0162066 | A1* | 6/2018 | Bruwer | B33Y 30/00 |
| 2019/0039092 | A1* | 2/2019 | Kim | B06B 1/045 |
| 2019/0064925 | A1* | 2/2019 | Kim | A63F 13/24 |
| 2019/0175961 | A1* | 6/2019 | Awiszus | A42B 3/225 |
| 2019/0354186 | A1* | 11/2019 | Bae | G06F 3/14 |
| 2019/0355229 | A1* | 11/2019 | Chavez | G08B 1/08 |
| 2019/0361758 | A1* | 11/2019 | Yamanaka | G06F 11/0736 |
| 2019/0384564 | A1* | 12/2019 | Nagai | G11B 20/10527 |
| 2020/0015917 | A1* | 1/2020 | Cavalier | A61B 34/32 |
| 2020/0066133 | A1* | 2/2020 | Shekh-Yusef | H04R 29/001 |
| 2020/0068354 | A1* | 2/2020 | Stapleford | H04W 4/20 |
| 2020/0169803 | A1* | 5/2020 | Kao | H04R 1/1041 |
| 2020/0239022 | A1* | 7/2020 | Hashimoto | G06F 3/016 |
| 2021/0104150 | A1* | 4/2021 | Levy | G08B 13/12 |

* cited by examiner

ELECTRONIC APPARATUS, CONTROL METHOD THEREFORE, AND STORAGE MEDIUM

BACKGROUND OF THE INVENTION

Field of the Invention

The present invention relates to an electronic apparatus suitable for recording a sound.

Description of the Related Art

Conventionally, there are sound recording apparatuses having a vibrator for vibrating a user interface member so that the user can recognize the user interface member is actually or effectively operated by feeling the vibration, without looking at a current status of the user interface member.

For example, Japanese Patent Application Laid-open No. 2017-49698 discloses a configuration including at least a vibrator, a user interface member, a vibration control unit, and a sound input unit, so that either one of the sound input unit or the vibration control unit is exclusively operated.

However, according to the conventional technology disclosed in the above patent document, since only one of the sound input unit or the vibration control unit is exclusively operated, when the sound input unit is operated, the vibration control unit cannot be operated.

For example, when recording a sound in a large theme park where environmental noise is large, the user interface member is not vibrated so that the user cannot recognize whether the user interface member is actually or effectively operated or not.

SUMMARY OF THE INVENTION

An object of one of aspects of the present invention is to provide an electronic apparatus that can solve the problems such as those mentioned above and can adaptively vibrate the user interface member so that the user can properly recognize an operation of the user interface member even while recording a sound.

In order to solve the above problems, an electronic apparatus according to one aspect of the present invention comprises:
a user interface member that can be operated by a user;
a vibrator for vibrating the user interface member at a predetermined frequency;
an environmental sound detector for detecting an environmental sound at the predetermined frequency; and
a controller for suppressing the vibration of the vibrator at the predetermined frequency according to a level of the environmental sound at the predetermined frequency detected by the environmental sound detector.

Further features of the present invention will become apparent from the following description of exemplary embodiments with reference to the attached drawings.

DESCRIPTION OF THE EMBODIMENTS

Hereinafter, an electronic apparatus according to an embodiment of the present invention will be described with reference to the drawings.

Figure 1:
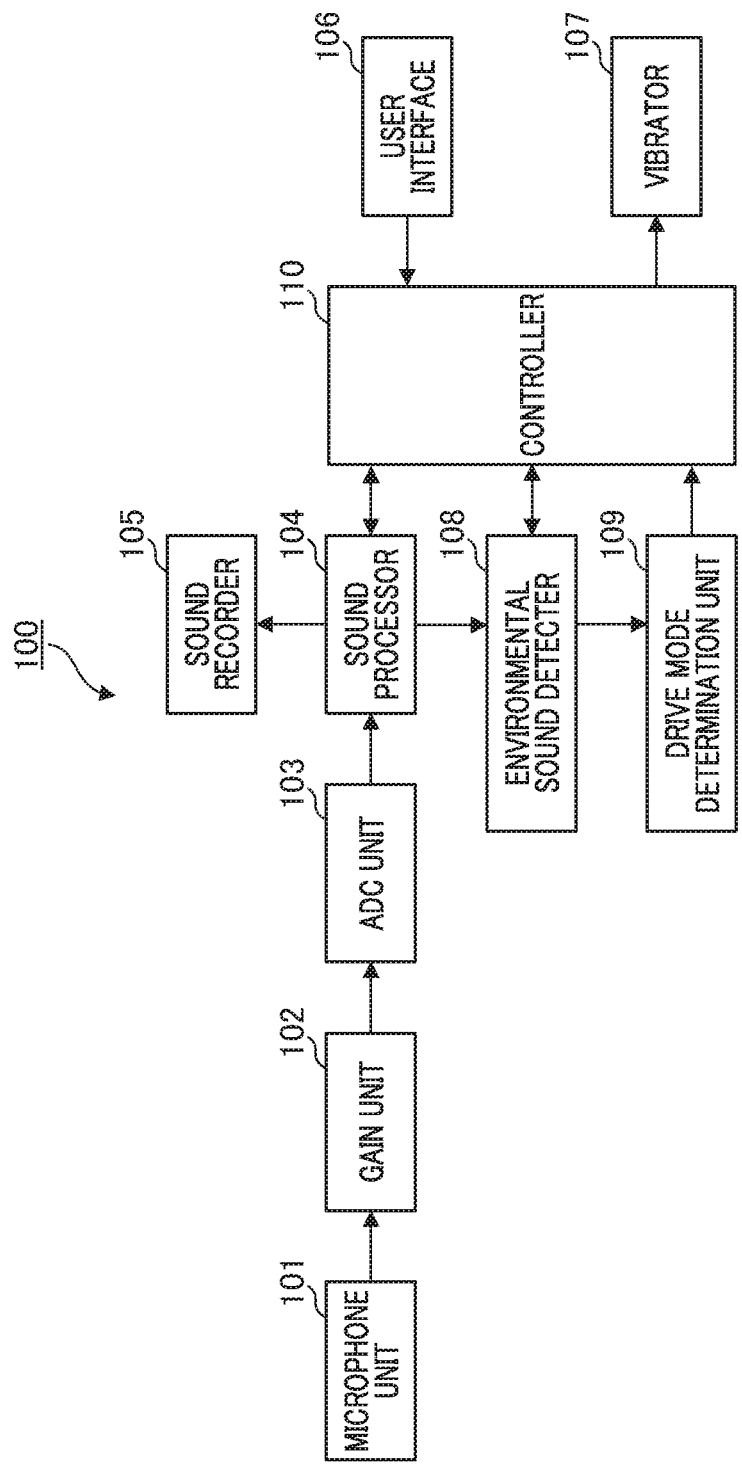
FIG. 1 is a block diagram of an electronic apparatus according to an embodiment.

FIG. 1 is a block diagram of an electronic apparatus 100, such as an image pickup apparatus or a camera, according to the embodiment.

101 denotes a microphone unit (sound input unit) for picking up a sound, 102 denotes a gain unit for amplifying a sound signal picked up by the microphone unit. 103 denotes an ADC unit including an AD converter for converting an analog signal output from the gain unit into a digital signal. 104 denotes a sound processor for processing a sound signal digitized and output from the ADC unit 103, for eliminating a wind noise and for emphasizing the sound signal.

105 denotes a sound recorder for recording to store the sound signal processed by the sound processor 104 in a detachable memory and so on such as a flash memory or a SD card. 106 denotes a user interface (member), which includes a mechanical member, such as a dial, a button, a lever, a switch, and so on, for inputting instruction by a user of the electronic apparatus. Here, "user interface member" is sometimes described as "user interface" for simplicity. 107 denotes a vibrator for indicating the user that the user operation is effectively performed to be input, by vibrating the user interface member 106 when the user effectively operates the user interface member 106.

In this embodiment, the vibrator 107 can selectively select a frequency (band) of the vibration among a plurality of frequency (bands). Although in the embodiment, those frequency bands do not overlap, some parts of those frequency bands may overlap each other. Here, although the frequency band has a certain band width, the band width may be narrow enough, therefore in the embodiment, "a frequency band" is sometimes described as "a frequency" for simplicity.

108 denotes an environmental sound detector for picking up a sound around the electronic apparatus when the user is using the electronic apparatus. The environmental sound detector 108 is connected to the sound processor 104 and a sound signal processed by the sound processor 104 is input to a controller 110.

109 denotes a drive mode determination unit for determining a drive mode for driving the vibrator 107.

The drive mode determination unit 109 adaptively determines the drive mode of the vibrator 107 so that a drive noise of the vibrator, when the user operates the user interface member 106 and when the vibrator is vibrated, does not substantially affect a sound signal recorded by the sound recorder 105, or is not recognizable when the sound signal is played back.

110 denotes a controller for controlling the sound processor 104, the environmental sound detector 108 and so on and control the drive mode of the vibrator 107 according to a determination result by the drive mode determination unit 109 when the user operates the user interface member 106.

Here, the controller 110 includes a CPU as a computer and performs control of a whole of the electronic apparatus according to the computer program stored in a memory not shown so that the controller 110 functions as a control unit.

As a specific example, in a case where the electronic apparatus is, for example, a digital still/movie camera, an operation of the user interface member 106 and the vibrator 107 will be described referring to FIGS. 2 and 3.

Figure 2:
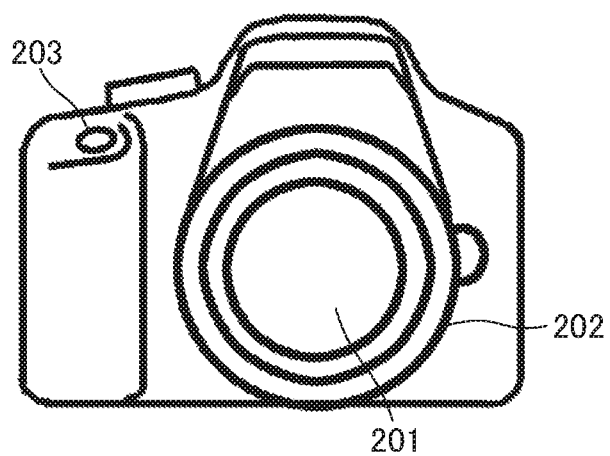
FIG. 2 is a diagram illustrating an external view of the electronic apparatus according to the embodiment.

FIG. 2 is a diagram illustrating an external view of the electronic apparatus according to the embodiment.

In FIG. 2, 201 denotes a lens unit for focusing an image on an image pickup device for picking up an image of an object. 202 denotes a ring operation member provided around the lens unit 201 for operating a zoom or a focus of the digital camera. 203 denotes a release switch for instructing a start of taking still picture or movie recording.

When a user operates the release switch 203 for starting the movie recording, and if the user rotates the ring operation member 202 for zooming, as an example, the ring operation member 202 is vibrated by the vibrator 107 so that the user can recognize and confirm that the ring operation member 202 is properly or effectively operated by feeling the vibration.

In this situation, the ring operation member 202 is one of examples of the user interface member 106.

Next, referring to FIG. 3, a flow for processing a sound while recording a movie image, as an example, will be described.

Figure 3:
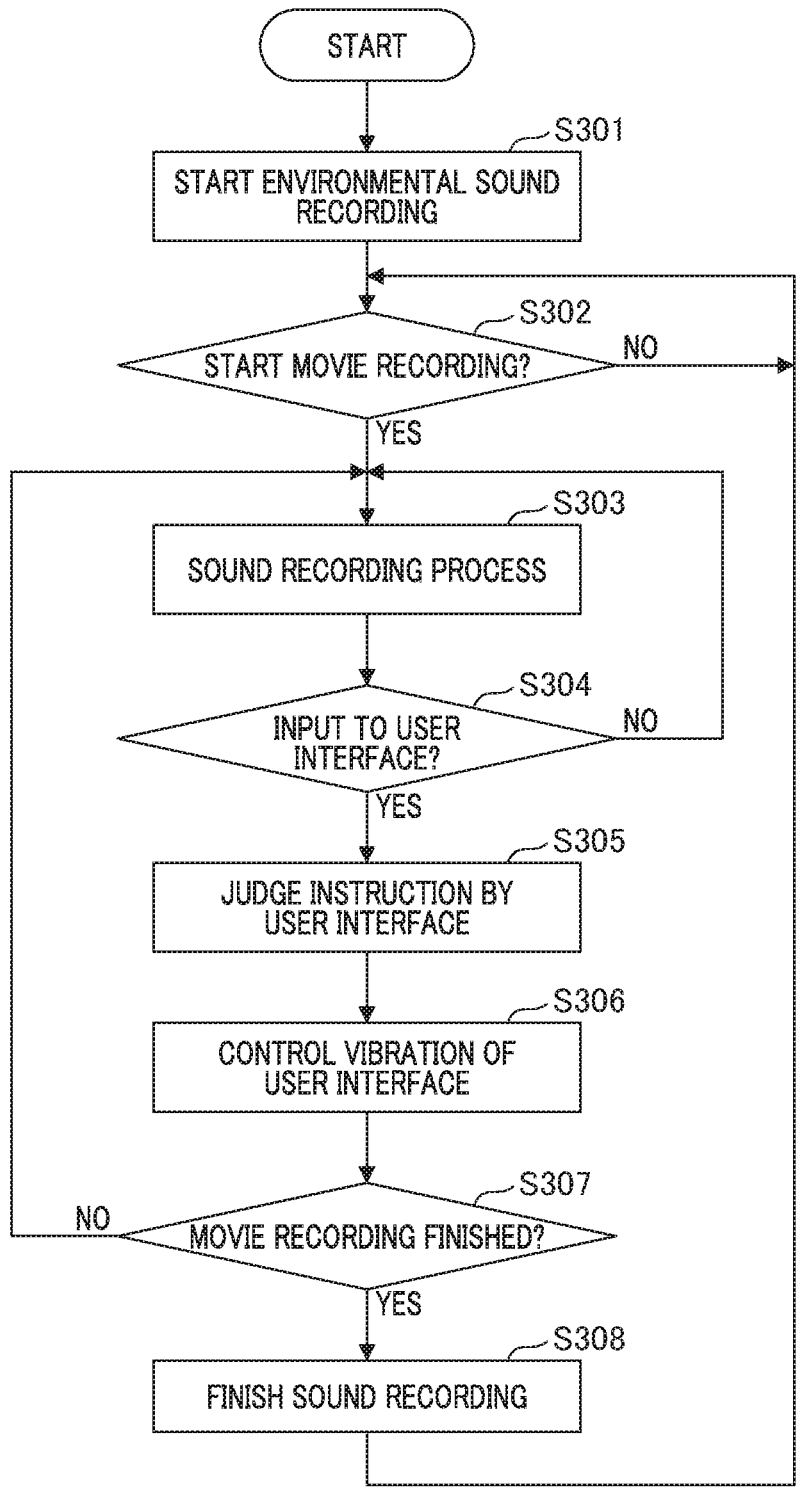
FIG. 3 is a flowchart illustrating a process flow of the electronic apparatus according to the embodiment.

FIG. 3 is a flowchart illustrating a process flow of the electronic apparatus performed by the controller 110 according to the embodiment.

The flow stars when a use starts operating the electronic apparatus 100. Then, in step S301, the controller 110 starts operations of the microphone unit 101, the gain unit 102, the ADC unit 103, the sound processor 104, the sound recorder 105, the environmental sound detector 108, the drive mode determination unit 109, and so on, so that an environmental sound recording is started.

Next, in step S302, it is judged whether an operation instruction by a user to start a movie recording is obtained or not. If No, step S302 is repeated and if Yes, the flow proceeds to step S303.

In step S303, the controller 110 controls the sound processor 104 to perform a sound recording processing, such as eliminating a wind noise or emphasizing a sound signal, for a sound recording. Then, the sound signal processed by the sound processor 104 is recorded (stored) in the sound recorder 105. In this step S303, although this embodiment does not show the image recording system, a movie image or a still image may also be recorded as a conventional movie/still camera does. Then, the flow proceeds to step S304.

In step S304, it is detected whether the user interface member 106 is operated by the user or not. If there is not an operation instruction then the flow returns to step S303 and if there is an operation instruction, then the flow proceeds to step S305.

In step S305, the controller 110 judges contents of the instruction input by the user interface member 106 and obtains the drive mode of the vibrator 107 from the drive mode determination unit 109. Then, the flow proceeds to step S306.

In step S306, the controller 110 controls respective part of the electronic apparatus 100 according to the content of the operation instruction input by the user interface member 106 and controls vibration of the vibrator 107 according to the drive mode for the vibrator, which is obtained in step S305. Then, the flow proceeds to step S307.

In step S307, it is judged whether an instruction to finish the movie recording is obtained or not via the user interface member, and if No, then the flow returns to step S303 to continue recording the sound and movie and if Yes, then proceeds to step S308.

In step S308, the controller 110 controls the sound processor 104 to finish the sound processing, such as the elimination of the wind noise or the emphasizing of the sound signal, which are sound processing for movie recording, and to control the sound recorder 105 to finish the recording operation so that the sound recording is finished. At the same time, the movie recording is also finished. Then, the flow returns to step S302.

Figure 4:
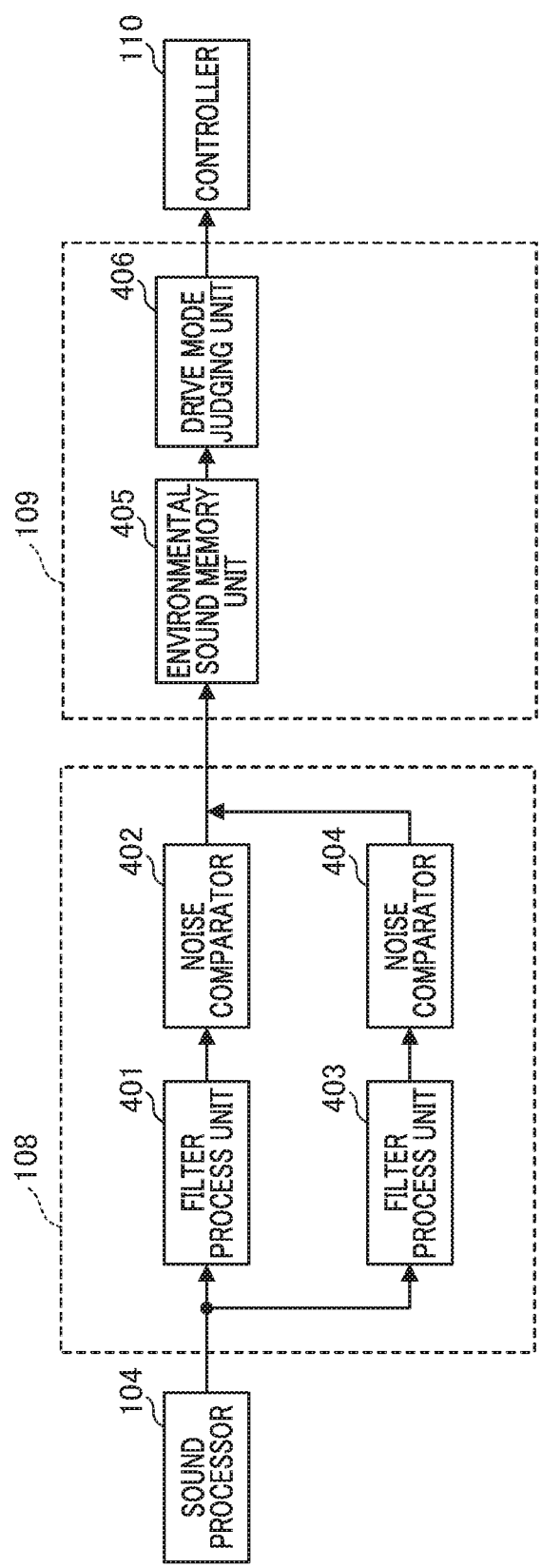
FIG. 4 is a detailed block diagram of a part of the electronic apparatus according to the embodiment.

Next, FIG. 4 is a detailed block diagram of a part of the electronic apparatus, such as the environmental sound detector 108 and the drive mode determination unit 109, according to the embodiment. An operation of FIG. 4 will be described referring to FIGS. 5 and 6.

Figure 5:
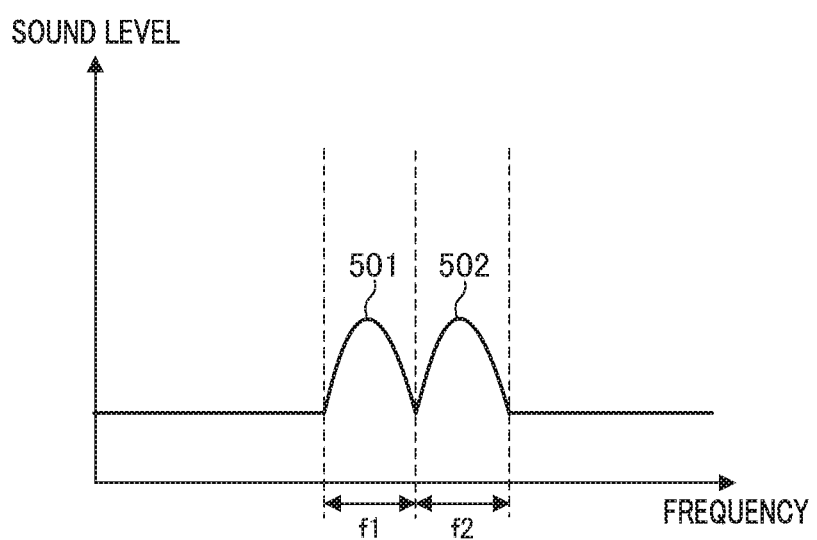
FIG. 5 is a graph illustrating a frequency characteristic of the vibrators according to the embodiment.
Figure 6A:
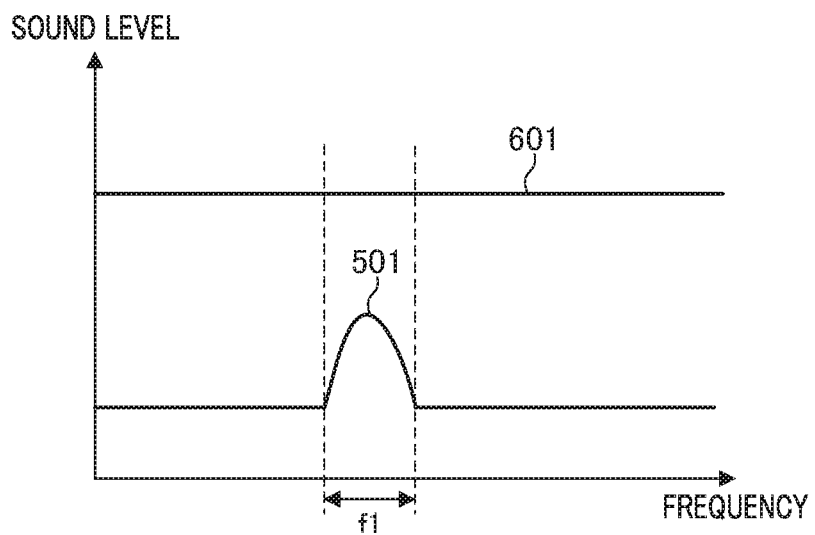
FIG. 6A is a diagram illustrating a relationship between a first threshold value and filtered signal according to the embodiment.
Figure 6B:
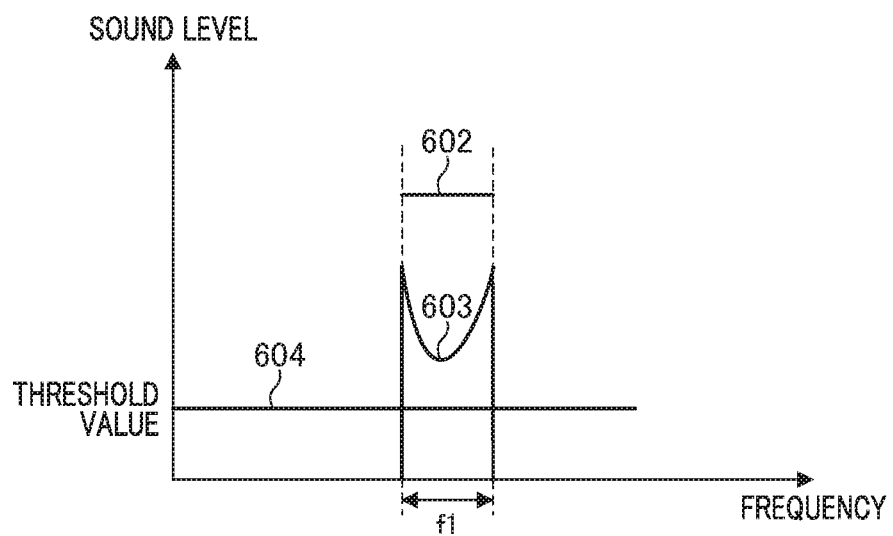
FIG. 6B is a diagram illustrating a relationship between a second threshold value and a difference signal according to the embodiment.

FIG. 5 is a graph illustrating a frequency characteristic of the vibrators according to the embodiment, and FIG. 6A is a diagram illustrating a relationship between a first threshold value and filtered signal according to the embodiment. FIG. 6B is a diagram illustrating a relationship between a second threshold value and difference signals according to the embodiment.

In this connection, the embodiment includes three drive patterns with which the vibrator 107 is vibrated, such as a first drive pattern, a second drive pattern, and a third drive pattern, however, more or less drive patterns may be applicable.

Figure 11A:
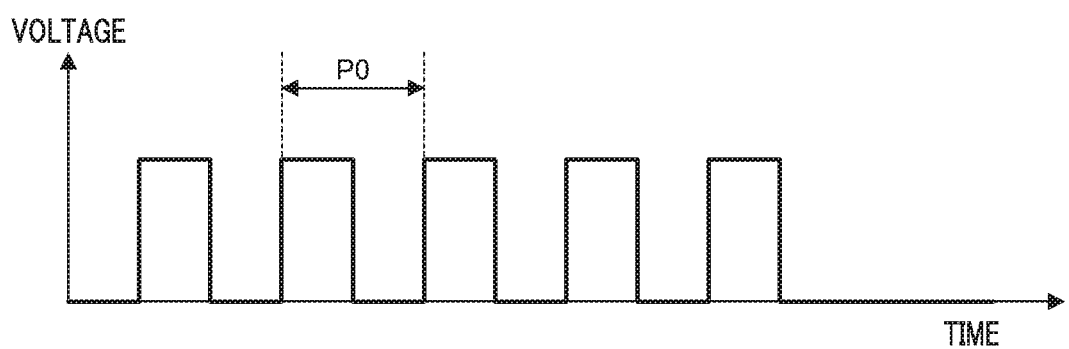
FIG. 11A is a graph illustrating a first drive pattern according to the embodiment.
Figure 11B:
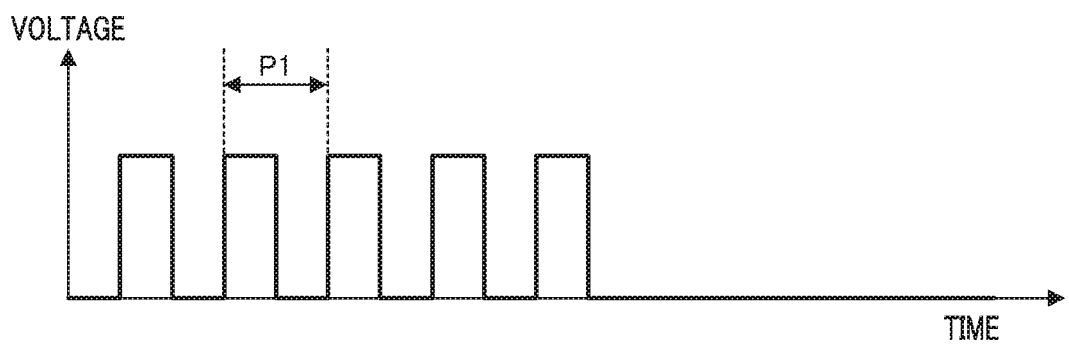
FIG. 11B is a graph illustrating a second drive pattern according to the embodiment.

FIG. 11A is a graph illustrating the first drive pattern according to the embodiment. FIG. 11B is a graph illustrating the second drive pattern according to the embodiment.

As shown in FIG. 11A, the first drive pattern has a drive frequency f1 (period P0) and as shown in FIG. 11B, the second drive pattern has a drive frequency f2 (period P1), which is different from the first drive pattern.

A frequency characteristic (a sound characteristic) 501, which corresponds to a noise characteristic of the vibrator 107 when the vibrator 107 is vibrated with the first drive pattern (at the first frequency) in a silent state, is illustrated as having a frequency band f1 (a first frequency band) in FIG. 5.

Alternatively, a frequency characteristic (sound characteristic) 502, which corresponds to a noise characteristic of the vibrator 107 when the vibrator 107 is vibrated with the second drive pattern (at the second frequency) in a silent state, is illustrated as having a frequency band f2 (a second frequency band) in FIG. 5.

In FIG. 4, 401 denotes a filter process unit as a bandpass filter for passing the sound signal (environmental sound) input from the sound processor 104 at the frequency band f1, 402 denotes a noise comparator for outputting a comparison result (a difference signal) between the sound signal filtered by the filter process unit 401 and the sound characteristic 501 as a first threshold value. Here, as mentioned in the above, the sound characteristic 501 is a sound characteristic that is obtained as a noise characteristic when the vibrator 107 is vibrated with the first drive pattern (at the first frequency) in a silent state.

In this connection, although the sound characteristic 501 is a curve in the embodiment, the sound characteristic 501 may be averaged to obtain a constant value as the first threshold value.

403 denotes a filter process unit as a bandpass filter for passing the sound signal (environmental sound) input from the sound processor 104 at the frequency band f2.

404 denotes a noise comparator for outputting a comparison result (a difference signal) between the sound signal filtered by the filter process unit 403 and the sound characteristic 502 as a second threshold value. Here, as mentioned in the above, the sound characteristic 502 is a sound characteristic that is obtained as a noise data characteristic when the vibrator 107 is vibrated with the second drive pattern (at the second frequency) in a silent state.

In this connection, although the sound characteristic 502 is a curve in the embodiment, the sound characteristic 502 may be averaged to obtain a constant value as the second threshold value.

An example of an operation of the noise comparator 402 will be described referring to FIG. 6. Here, an explanation of an operation of the noise comparator 404 will be omitted since an operation of the noise comparators 404 is the same as the noise comparator 402 other than its frequency band.

If an output of the sound processor 104 has a sound characteristic 601 shown in FIG. 6A, an output of the filter process unit 401 has a sound characteristic 602 as shown in FIG. 6B.

By calculating a difference between the sound characteristics 602 and 501, the sound characteristics 603 is obtained as an output of the noise comparator 402. The noise comparator 404 outputs a difference signal in a similar way.

405 denotes an environmental sound memory unit for sequentially and respectively storing outputs from the noise comparators 402 and 404.

The environmental sound memory unit 405 is configured as a FIFO memory and can store data having a predetermined length so that old data is automatically deleted.

406 denotes a drive mode judging unit that judges which drive mode should be selected to drive the vibrator 107 for vibrating the user interface member 106, from the three patterns, that is the first drive pattern, the second drive pattern, or not driving the vibrator. That is, the drive mode judging unit has a mode in which the vibrator is vibrated at the first frequency without vibrating at the second frequency, a mode in which the vibrator is vibrated at the second frequency without vibrating at the first frequency, and a mode in which the vibrator is not vibrated. The drive mode judging unit 406 judges which of the above three modes should be selected.

As a method for judging, the judgement by the drive mode judging unit 406 is performed based on the comparison result, that is to say, whether the data of environmental sound memory unit 405, which is the sound characteristics (difference signal) 603, is larger than the predetermined threshold value 604 or not. Thus, based on the comparison result, the drive mode judging unit 406 controls to vibrate the vibrator in, for example, the first drive pattern (at the first frequency) and the second drive pattern (at the second frequency).

The threshold value 604 may be determined based on a sound level from the sound processor 104 when the noise of the vibrator becomes unrecognizable In this connection, in the embodiment, the difference signals between the environmental sound and the sound characteristics 501 and 502, which are used as the first threshold values at the first frequency f1 and the second frequency f2, are respectively obtained, then the difference signals are compared with the second threshold value 604. However, this embodiment may be applied to a case where only one vibration frequency is used to vibrate the vibrator.

That is, if an environmental sound at the first frequency band becomes smaller than the first threshold value, the vibration of the vibrator 107 may be suppressed, wherein "to suppress" may include "to stop". Here, the first threshold value may be a curve such as the sound characteristic 501, or may be an averaged constant value.

Similarly, the sound characteristics 501 and 502, which are used as the first threshold values, may be respectively averaged to provide respective constant values. That is, the first threshold value may be a constant value.

Furthermore, although the sound characteristic 603 is a curve in FIG. 6B, the sound characteristic 603 may be averaged to provide a constant value to be compared with the second threshold value 604.

Figure 7:
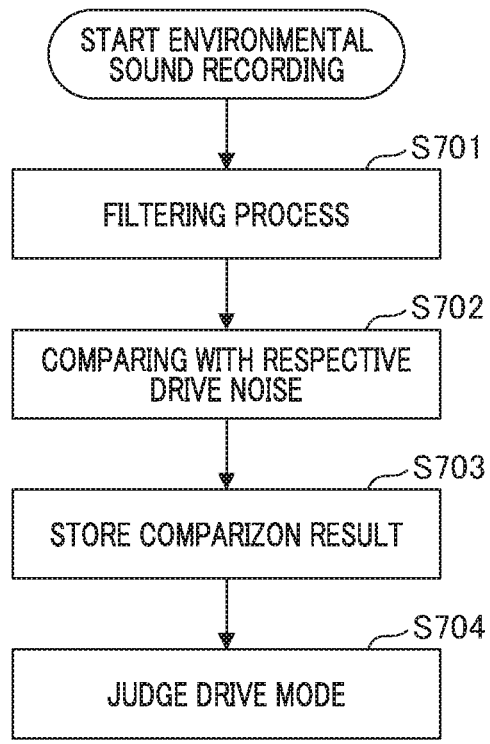
FIG. 7 is a flowchart illustrating a process flow of an environmental sound detection and a determination of drive modes according to the embodiment.

Next, FIG. 7 is a flowchart illustrating a process flow of an environmental sound detection and a determination of drive modes according to the embodiment. Operations of the environmental sound detector 108 and the drive mode determination unit 109 are explained hereinafter referring to FIGS. 7 to 10.

Figure 8A:
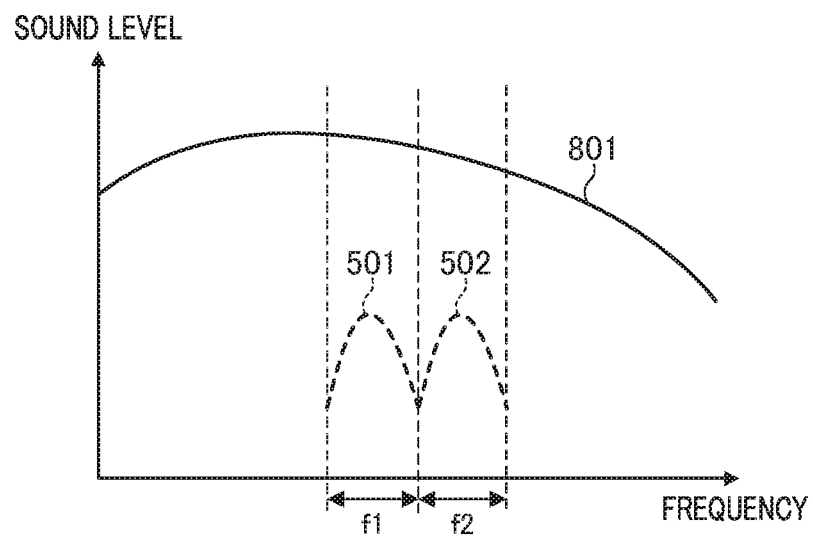
FIG. 8A is a diagram illustrating a relationship between noise characteristics and an input sound signal according to an example.
Figure 8B:
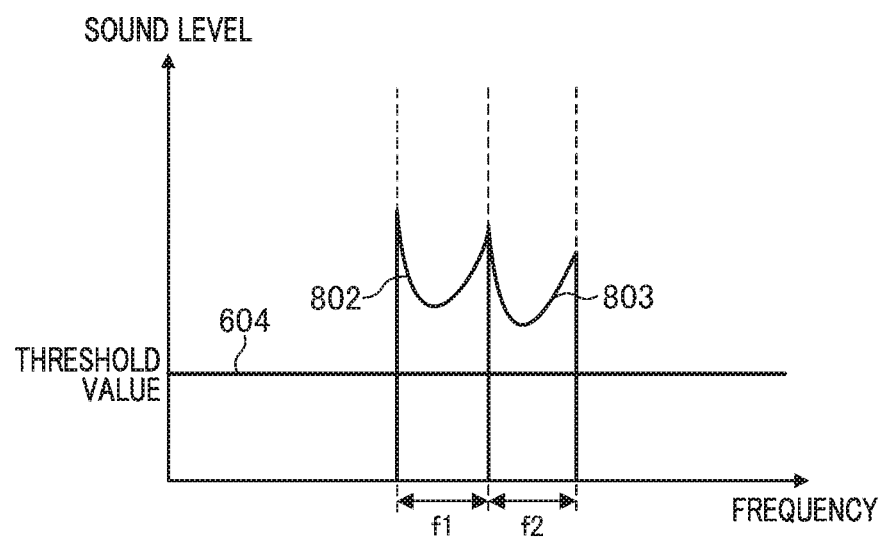
FIG. 8B is a diagram illustrating a relationship between the threshold value and the difference signals according to the example.

FIG. 8A is a diagram illustrating a relationship between noise characteristics and an input sound signal according to an example. FIG. 8B is a diagram illustrating a relationship between the threshold value and the difference signals according to the example.

The flowchart shown in FIG. 7 will be described assuming that sound data having a sound characteristic 801 in FIG. 8A is input to the filter process units 401 and 403 from the sound processor 104.

When the sound data is input to the filter process units 401 and 403 and then to the noise comparators 402 and 404, the flow proceeds to step S701. In step S701, the sound data is filtered by the filter process unit 401, which has the frequency band f1, and then is input to the noise comparator 402.

Similarly, the sound data filtered by the filter process unit 403, which has the frequency band f2, is input to the noise comparator 404. Then, the flow proceeds to step S702.

In step S702, the sound data filtered by the filter process unit 401 is compared with the sound characteristic 501, which corresponds to noise characteristic, by the noise comparator 402 to generates the sound data having the sound characteristic 802 (difference signal) as shown in FIG. 8B, which is then input to the environmental sound memory unit 405.

Similarly, the sound data filtered by the filter process unit 403 is compared with the sound characteristic 502, which corresponds to noise characteristic, by the noise comparator 404 to generates the sound data having the sound characteristic 803 (difference signal) as shown in FIG. 8B, which is then input to the environmental sound memory unit 405. Then, the flow proceeds to step S703.

In step S703, the sound characteristic data (difference signals) 802 and 803 output from the noise comparators 402 and 404 is respectively stored in the environmental sound memory unit 405. Then, the flow proceeds to step S704.

In step S704, the drive mode judging unit 406 respectively compares the second threshold value 604 with the sound characteristic data 802 and 803 stored in the environmental sound memory unit 405.

As shown in FIG. 8B, since both the sound characteristic data (difference signal) 802 at the frequency band f1 and the sound characteristic data (difference signal) 803 at the frequency band f2 are respectively larger than the threshold value 604, the drive mode judging unit 406 judges that the vibrator can be driven without problem with either of the first drive pattern or the second drive pattern.

In this connection, in FIG. 8B, although both the sound characteristic data 802 at the frequency band f1 and the sound characteristic data 803 at the frequency band f2 are respectively larger than the threshold value 604, since a difference between the threshold value 604 and the sound characteristic data 802 at the frequency band f1 is larger than a difference between the threshold value 604 and the sound characteristic data 803 at the frequency band f1, as shown in FIG. 8B, the drive mode judging unit 406 may judge so that the first drive pattern should be selected.

Furthermore, in FIG. 8B, since a difference between the threshold value 604 and the sound characteristic data 802 at the frequency band f1 is larger than a difference between the threshold value 604 and the sound characteristic data 803 at the frequency band f1, the drive mode judging unit 406 may judge so that a vibration with the first drive pattern should be larger than a vibration with the second drive pattern, while the vibrator is driven with both the first drive pattern and the second drive pattern.

Figure 9A:
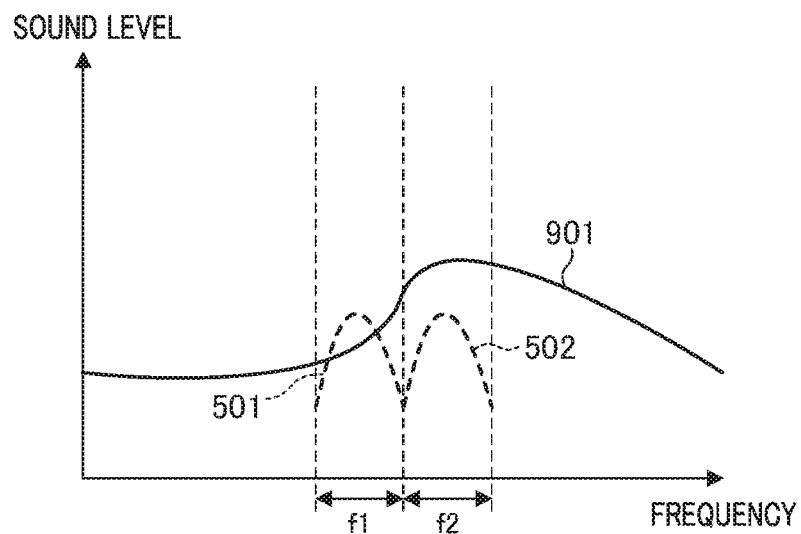
FIG. 9A is a diagram illustrating a relationship between the noise characteristics and an input sound signal according to another example.
Figure 9B:
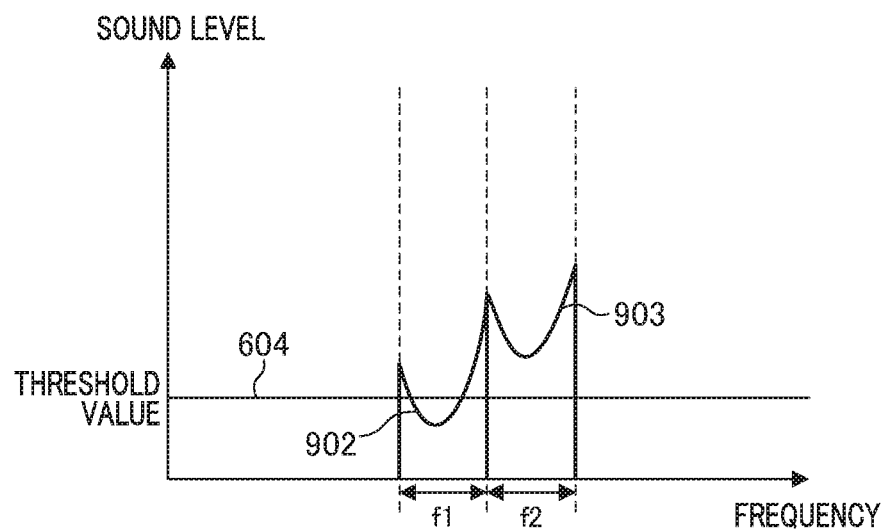
FIG. 9B is a diagram illustrating a relationship between the threshold value and the difference signals according to another example.

Next, FIG. 9A is a diagram illustrating a relationship between the noise characteristics and an input sound signal according to another example. FIG. 9B is a diagram illustrating a relationship between the threshold value and the difference signals according to another example.

In FIG. 9A, sound data having a sound characteristic 901 is input from the sound processor 104 to the filter process units 401 and 403, then step S701 is started.

In step S701, the sound data filtered by the filter process unit 401, which has the frequency band f1, is input to the noise comparator 402.

Similarly, the sound data filtered by the filter process unit 403, which has the frequency band f2, is input to the noise comparator 404. Then, the flow proceeds to step S702.

In step S702, the sound data filtered by the filter process unit 401 is compared with the sound characteristic (noise characteristic) 501 by the noise comparator 402 to generates the sound data having the sound characteristic (difference signal) 902 as shown in FIG. 9B, which is then input to the environmental sound memory unit 405.

Similarly, the sound data filtered by the filter process unit 403 is compared with the sound characteristic (noise characteristic) 502 by the noise comparator 404 to generates the sound data having the sound characteristic (difference signal) 903 as shown in FIG. 9B, which is then input to the environmental sound memory unit 405. Then, the flow proceeds to step S703.

In step S703, the sound characteristic data (difference signals) 902 and 903 output from the noise comparators 402 and 404 are respectively stored in the environmental sound memory unit 405. Then, the flow proceeds to step S704.

In step S704, the drive mode judging unit 406 respectively compares the second threshold value 604 with the sound characteristic data 902 and 903 stored in the environmental sound memory unit 405.

As shown in FIG. 9B, since a part of the sound characteristic data 902 at the frequency band f1 is below the threshold value 604, the drive mode judging unit 406 judges that the vibrator should not be driven with the first drive pattern (at the first frequency).

Since the sound characteristic data 903 at the frequency band f2 is larger than the threshold value 604, the drive mode judging unit 406 judges that the vibrator can be driven without problem with the second drive pattern (at the second frequency).

Figure 10A:
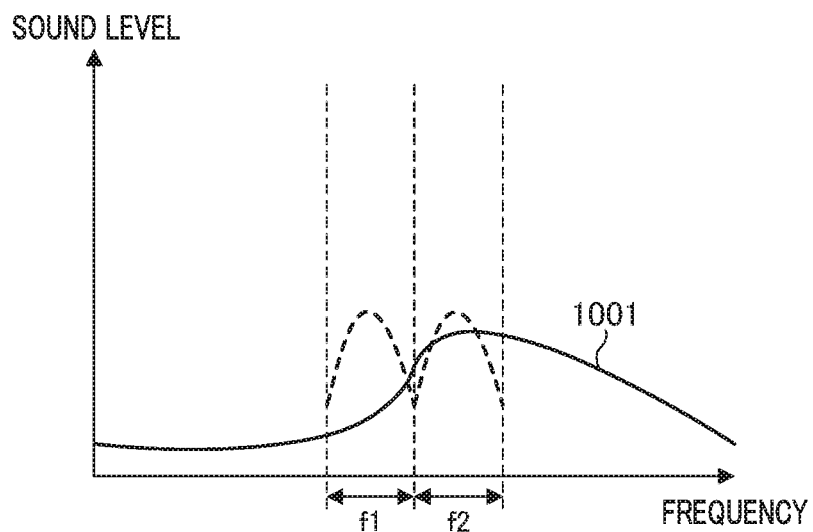
FIG. 10A is a diagram illustrating a relationship between the noise characteristics and an input sound signal according to another different example.
Figure 10B:
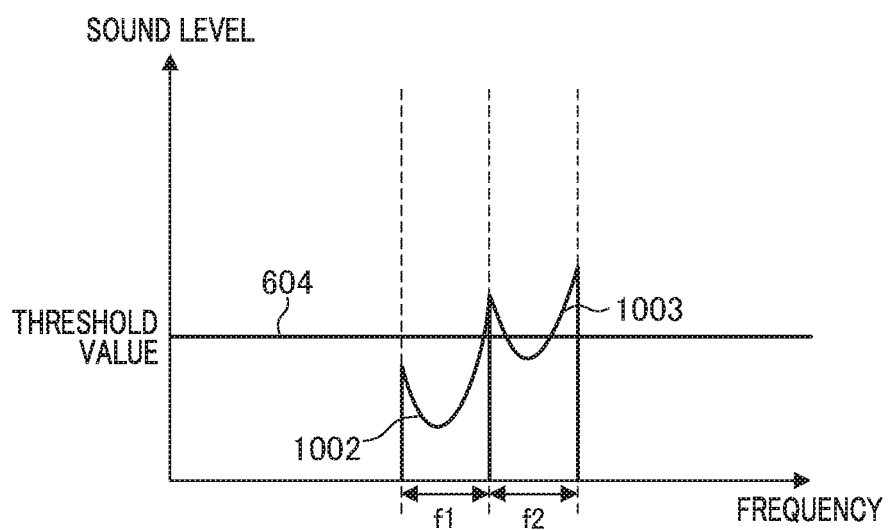
FIG. 10B is a diagram illustrating a relationship between the threshold value and difference signals according to the different example.

Next, FIG. 10A is a diagram illustrating a relationship between the noise characteristics and an input sound signal according to another different example. FIG. 10B is a diagram illustrating a relationship between the threshold value and difference signals according to the different example.

In FIG. 10A, sound data having a sound characteristic 1001 is input from the sound processor 104 to the filter process units 401 and 403, then step S701 is started.

In step S701, the sound data filtered by the filter process unit 401, which has the frequency band f1, is input to the noise comparator 402.

Similarly, the sound data filtered by the filter process unit 403, which has the frequency band f2, is input to the noise comparator 404. Then, the flow proceeds to step S702.

In step S702, the sound data filtered by the filter process unit 401 is compared with the sound characteristic (noise characteristic) 501 by the noise comparator 402 to generates the sound data having the sound characteristic (difference signal) 1002 as shown in FIG. 10B, which is then input to the environmental sound memory unit 405.

Similarly, the sound data filtered by the filter process unit 403 is compared with the sound characteristic (noise characteristic) 502 by the noise comparator 404 to generates the sound data having the sound characteristic (difference signal) 1003 as shown in FIG. 10B, which is then input to the environmental sound memory unit 405. Then, the flow proceeds to step S703.

In step S703, the sound characteristic data (difference signals) 1002 and 1003 output from the noise comparators 402 and 404 are respectively stored in the environmental sound memory unit 405. Then, the flow proceeds to step S704.

In step S704, the drive mode judging unit 406 respectively compares the second threshold value 604 with the sound characteristic data 902 and 903 stored in the environmental sound memory unit 405.

As shown in FIG. 10B, since a part of the sound characteristic data 1002 at the frequency band f1 and a part of the sound characteristic data 1003 at the frequency band f2 are smaller than the threshold value 604, the drive mode judging unit 406 judges that the vibrator should not be driven with any of the first drive pattern or the second drive pattern.

That is, the drive mode judging unit 406 judges that the vibration of the vibrator 107 should be stopped.

In this connection, the drive mode judging unit 406 may judge that the vibration of the vibrator 107 should be stopped when the whole of the sound characteristic data 1002 at the frequency band f1 and the whole of the sound characteristic data 1003 at the frequency band f2 are smaller than the threshold value 604.

Or, the drive mode judging unit 406 may judge that the vibration of the vibrator 107 should be stopped when an averaged level of the sound characteristic data 1002 at the frequency band f1 and an averaged level of the sound characteristic data 1003 at the frequency band f2 are smaller than the threshold value 604.

That is, the drive mode judging unit 406 may judge that the vibration of the vibrator 107 should be suppressed or stopped when a part of, the whole of, or an averaged level of the sound characteristic data 1002 at the frequency band f1 and a part of, the whole of, or an averaged level of the sound characteristic data 1003 at the frequency band f2 are smaller than the threshold value 604 (the second threshold value).

In this connection, in the above explanation, the first drive pattern and the second drive pattern have respectively different drive frequencies, however, drive frequencies may be the same while drive levels are different, or both of drive frequencies and drive levels may be respectively different.

As explained in the above, according to the embodiment, noise caused by vibrating the user interface member is adaptively suppressed so that recognizable noise is effectively and substantially prevented from being recorded while sound is recorded.

In this connection, in the embodiment, although sound recording is started at the same time of starting of the movie recording and sound recording is stopped at the same time of stopping of the movie recording, the apparatus may have a mode where sound recording is not performed during the movie or still picture recording.

In such case, at least the drive mode judging unit 406 may be inoperative, and in response to starting of sound recording with movie/still picture recording, the environmental sound recording may be also started at the same time. Or, the environmental sound recording may be started before starting the movie/still picture recording.

The present invention is not limited to the embodiments described above, various modifications can be made on the basis of the main concept of the present invention, and such modifications are not intended to be excluded from the scope of the present invention. The scope of the following claims is to be accorded the broadest interpretation so as to encompass all such modifications and equivalent structures and functions.

In addition, as a part or the % hole of the control according to this embodiment, a computer program realizing the function of the embodiment described above may be supplied to the electronic apparatus through a network or various storage media. Then, a computer (or a CPU, an MPU, or the like) of the electronic apparatus may be configured to read and execute the program. In such a case, the program and the storage medium storing the program configure the present invention.

This application claims the benefit of Japanese Patent Application No. 2019-58151 filed on Mar. 26, 2019, which is hereby incorporated by reference herein in its entirety.

What is claimed is:

1. An electronic apparatus for recording audio signals comprising:
a user interface member that can be operated by a user;
a vibrator for vibrating the user interface member at first frequency and second frequency, said vibrations indicating operation of the user interface member by the user;
an environmental sound detector for detecting an environmental sound at the first frequency and the second frequency; and
at least one processor or circuit which function as a controller for suppressing the vibration of the vibrator at the first frequency according to a level of the environmental sound at the first frequency detected by the environmental sound detector,
the controller determining whether a level of the environmental sound at the first frequency is smaller or larger than the predetermined threshold value,
said controller suppresses the vibration at the first frequency and controls the vibrator to vibrate at the second frequency in a case where the level of the environmental sound at the first frequency is smaller than the predetermined threshold value.

2. The electronic apparatus according to claim 1, wherein the vibrator is capable of changing the frequency of the vibration.

3. The electronic apparatus according to claim 2, wherein the controller controls the vibration of the vibrator so that the vibrator vibrates the user interface member at least at one of a first frequency band and a second frequency band, depending on a level of each of the environmental sound at the first frequency band and at the second frequency band.

4. The electronic apparatus according to claim 3, wherein the controller has a mode to stop the vibration of the vibrator at the first frequency band and allow the vibration of the vibrator at the second frequency band, a mode to stop the vibration of the vibrator at the second frequency band and allow the vibration of the vibrator at the first frequency band, and a mode to stop the vibration of the vibrator at both of the first frequency band and the second frequency band, when suppressing the vibration of the vibrator.

5. The electronic apparatus according to claim 3, wherein the first frequency band and the second frequency band do not overlap.

6. The electronic apparatus according to claim 3, wherein the controller calculates a first difference value between the first threshold value and the environmental sound at the first frequency band, calculates a second difference value between the first threshold value and the environmental sound at the second frequency band, and relatively increases the vibration at the first frequency band than at the second frequency band if the first difference value is larger than the second difference value.

7. The electronic apparatus according to claim 3, wherein the controller makes the vibration at the first frequency band larger than the vibration at the second frequency band in a case where the level of the environmental sound at the first frequency band is larger than the level of the environmental sound at the second frequency band.

8. The electronic apparatus according to claim 1, wherein the controller suppresses the vibration at the predetermined frequency band according to a comparison result between the level of the environmental sound at the predetermined frequency band with a predetermined threshold value, wherein the first threshold value is determined based on a noise characteristic of the vibrator when the vibrator is vibrated at the predetermined frequency band.

9. The electronic apparatus according to claim 8, wherein the first threshold level is determined based on the noise characteristic of the vibrator when the vibrator is vibrated at the predetermined frequency band in a silent state.

10. The electronic apparatus according to claim 8, wherein the controller calculates a difference value between the first threshold value and the environmental sound at the predetermined frequency band, and suppresses the vibration at the predetermined frequency band depending on a comparison result between a second threshold value and at least one of a part, a whole and an average of the difference value.

11. The electronic apparatus according to claim 1, wherein the controller has a mode to stop the vibration of the vibrator when suppressing the vibration of the vibrator.

12. The electronic apparatus according to claim 1, wherein the controller suppresses the vibration at the predetermined frequency band according to a level of the environmental sound at the predetermined frequency band in a case where a photography mode for recording a sound inputted by a sound input unit is selected.

13. A control method for controlling an electronic apparatus for recording audio signals, the apparatus having a user interface member that can be operated by a user, and a vibrator for vibrating the user interface member at first frequency and second frequency, comprises:
  detecting an environmental sound at the first frequency and the second frequency, said vibrations indicating operation of the user interface member by the user; and
  controlling to suppress the vibration of the vibrator at the first frequency according to a level of the environmental sound at the first frequency detected by the detecting,
  said controlling comprises determining whether a level of the environmental sound at the first frequency is smaller or larger than the predetermined threshold value,
  said controlling suppresses the vibration at the first frequency and controls the vibrator to vibrate at the second frequency in a case where the level of the environmental sound at the first frequency is smaller than the predetermined threshold value.

14. A non-transitory computer-readable storage medium that stores a computer program to control an electronic apparatus for recording audio signals, the apparatus having a user interface member that can be operated by a user, and a vibrator for vibrating the user interface member at first frequency and second frequency, wherein the computer program comprises instructions for executing following processes:
  detecting an environmental sound at the first frequency and second frequency, said vibrations indicating operation of the user interface member by the user; and
  controlling to suppress the vibration of the vibrator at the first frequency according to a level of the environmental sound at the first frequency detected by the detecting,
  said controlling comprises determining whether a level of the environmental sound at the first frequency is smaller or larger than the predetermined threshold value,
  said controlling suppresses the vibration at the first frequency and controls the vibrator to vibrate at the second frequency in a case where the level of the environmental sound at the first frequency is smaller than the predetermined threshold value.

* * * * *